United States Patent
Shampine et al.

(10) Patent No.: US 10,590,758 B2
(45) Date of Patent: Mar. 17, 2020

(54) NOISE REDUCTION FOR TUBEWAVE MEASUREMENTS

(71) Applicant: SCHLUMBERGER TECHNOLOGY CORPORATION, Sugar Land, TX (US)

(72) Inventors: Rod William Shampine, Houston, TX (US); Adam Keilers, Richmond, TX (US); Andrey Bogdan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 468 days.

(21) Appl. No.: 14/939,844

(22) Filed: Nov. 12, 2015

(65) Prior Publication Data

US 2017/0138176 A1    May 18, 2017

(51) Int. Cl.
    *E21B 47/06*    (2012.01)
(52) U.S. Cl.
    CPC .................. *E21B 47/06* (2013.01)
(58) Field of Classification Search
    CPC ........... E21B 47/16; E21B 47/12; E21B 47/14
    See application file for complete search history.

(56) References Cited

U.S. PATENT DOCUMENTS

| | | |
|---|---|---|
| 2,751,183 A | 6/1956 | Crookston |
| 3,254,524 A | 6/1966 | Tannenberg |
| 3,376,949 A | 4/1968 | Baker |
| 3,387,225 A | 6/1968 | Wainwright |
| 3,679,021 A | 7/1972 | Goldberg |
| 3,979,724 A | 9/1976 | Silverman et al. |
| 4,131,178 A | 12/1978 | Bouyoucos |
| 4,408,676 A | 10/1983 | McCoy |
| 4,637,463 A | 1/1987 | McCoy |
| 4,674,067 A | 6/1987 | Zemanek, Jr. |
| 4,793,178 A | 12/1988 | Ahem et al. |
| 4,802,144 A | 1/1989 | Holzhausen et al. |
| 4,823,326 A | 4/1989 | Ward |

(Continued)

FOREIGN PATENT DOCUMENTS

| | | |
|---|---|---|
| CA | 2037277 A1 | 1/1992 |
| EP | 390526 A2 | 10/1990 |

(Continued)

OTHER PUBLICATIONS

International Search Report and Written Opinion issued in International Patent Appl. No. PCT/US2016/060879 dated Mar. 17, 2017; 10 pages.

(Continued)

*Primary Examiner* — Wei Wang
(74) *Attorney, Agent, or Firm* — Cathy Hewitt

(57) ABSTRACT

A pressure wave system having a tubular member, a signal source, a sensor, and a source of noise, has a noise interference system employing one or more a lateral branches to cancel pressure noise, and/or amplify or filter the pressure wave signal. A related method generates the pressure wave signal, connects the lateral branch or branches to amplify or filter the signal and/or cancel noise from the system, and receives the signal or a response of the system to the signal. The lateral branches are simple pipe stubs or loops that can be made using ordinary piping components, or are more complex designs.

26 Claims, 5 Drawing Sheets

(56) References Cited

U.S. PATENT DOCUMENTS

| | | | |
|---|---|---|---|
| 4,885,727 A | 12/1989 | Auger et al. |
| 4,932,253 A | 6/1990 | McCoy |
| 4,934,186 A | 6/1990 | McCoy |
| 4,993,001 A | 2/1991 | Winbow et al. |
| 5,031,163 A | 7/1991 | Holzhausen et al. |
| 5,081,613 A | 1/1992 | Holzhausen et al. |
| 5,093,811 A | 3/1992 | Mellor et al. |
| 5,117,399 A | 5/1992 | McCoy et al. |
| 5,170,378 A | 12/1992 | Mellor et al. |
| 5,200,894 A | 4/1993 | McCoy et al. |
| 5,206,836 A | 4/1993 | Holzhausen et al. |
| 5,285,388 A | 2/1994 | McCoy et al. |
| 5,361,837 A | 11/1994 | Winbow |
| 5,406,482 A | 4/1995 | McCoy et al. |
| 5,464,058 A | 11/1995 | McCoy et al. |
| 5,472,049 A | 12/1995 | Chaffee et al. |
| 5,517,854 A | 5/1996 | Plumb et al. |
| 6,155,378 A | 12/2000 | Qatu et al. |
| 6,192,316 B1 | 2/2001 | Hornby |
| 6,401,814 B1 | 6/2002 | Owens et al. |
| 6,478,107 B1 | 11/2002 | Birchak et al. |
| 6,724,687 B1 | 4/2004 | Stephenson et al. |
| 6,970,398 B2 | 11/2005 | Lavrut et al. |
| 6,978,211 B2 | 12/2005 | Soliman et al. |
| 7,050,356 B2 | 5/2006 | Jeffryes |
| 7,100,688 B2 | 9/2006 | Stephenson et al. |
| 7,302,849 B2 | 12/2007 | Segal et al. |
| 7,313,481 B2 | 12/2007 | Moos et al. |
| 7,345,594 B2 * | 3/2008 | Huang .................. E21B 47/18 340/854.3 |
| 7,397,388 B2 | 7/2008 | Huang et al. |
| 7,515,505 B2 | 4/2009 | Krohn et al. |
| 7,552,761 B2 | 6/2009 | Moriarty |
| 7,617,873 B2 | 11/2009 | Lovell et al. |
| 7,819,188 B2 | 10/2010 | Auzerais et al. |
| 8,047,285 B1 | 11/2011 | Smith |
| 8,838,427 B2 | 9/2014 | Segal et al. |
| 9,057,232 B2 | 6/2015 | Cioanta et al. |
| 9,841,523 B2 | 12/2017 | Shampine et al. |
| 10,047,601 B2 | 8/2018 | Shampine et al. |
| 2002/0162660 A1 | 11/2002 | Depiak et al. |
| 2004/0065439 A1 | 4/2004 | Tubel et al. |
| 2004/0069530 A1 | 4/2004 | Prain et al. |
| 2005/0246131 A1 | 11/2005 | Segal et al. |
| 2006/0072374 A1 | 4/2006 | Kusko |
| 2006/0207764 A1 | 9/2006 | Rytlewski |
| 2006/0293857 A1 | 12/2006 | Moos et al. |
| 2007/0194947 A1 | 8/2007 | Huang |
| 2008/0080992 A1 | 4/2008 | Cummins |
| 2008/0236935 A1 | 10/2008 | Coates et al. |
| 2008/0239872 A1 | 10/2008 | Miller et al. |
| 2008/0296025 A1 | 12/2008 | Inderberg et al. |
| 2009/0006005 A1 | 1/2009 | Segal et al. |
| 2009/0072180 A1 | 3/2009 | Johnson et al. |
| 2009/0127024 A1 * | 5/2009 | Lynch .................. F16L 55/033 181/247 |
| 2009/0159272 A1 | 6/2009 | Auzerais et al. |
| 2009/0295597 A1 | 12/2009 | Grimseth |
| 2010/0270031 A1 | 10/2010 | Patel |
| 2011/0011576 A1 | 1/2011 | Cavender et al. |
| 2011/0267922 A1 | 11/2011 | Shampine et al. |
| 2012/0017673 A1 | 1/2012 | Godager |
| 2012/0018150 A1 | 1/2012 | Shampine et al. |
| 2012/0092960 A1 | 4/2012 | Gaston et al. |
| 2012/0327742 A1 | 12/2012 | Kusko et al. |
| 2013/0043873 A1 | 2/2013 | Brannon et al. |
| 2013/0154846 A1 | 6/2013 | Mangione et al. |
| 2013/0167628 A1 | 7/2013 | Hull et al. |
| 2013/0181843 A1 | 7/2013 | Moghaddamnia et al. |
| 2013/0264054 A1 | 10/2013 | East et al. |
| 2014/0056101 A1 | 2/2014 | Vu et al. |
| 2014/0083689 A1 | 3/2014 | Streich et al. |
| 2014/0239956 A1 | 8/2014 | Hoversten et al. |
| 2014/0311752 A1 | 10/2014 | Streich et al. |
| 2015/0159462 A1 | 6/2015 | Cutler |
| 2015/0159477 A1 | 6/2015 | Lecerf et al. |
| 2015/0285946 A1 | 10/2015 | Kamal et al. |
| 2015/0300115 A1 | 10/2015 | Murphree et al. |
| 2015/0300131 A1 | 10/2015 | Vigderman et al. |
| 2015/0300327 A1 | 10/2015 | Sweatman et al. |
| 2016/0146962 A1 | 5/2016 | Hayward |
| 2016/0258281 A1 | 9/2016 | Mandal |
| 2017/0122088 A1 | 5/2017 | Dumoit |
| 2017/0138169 A1 | 5/2017 | Bogdan et al. |
| 2017/0138182 A1 | 5/2017 | Bogdan et al. |

FOREIGN PATENT DOCUMENTS

| | | |
|---|---|---|
| JP | H0419313 A | 1/1992 |
| WO | 2004074869 A2 | 9/2004 |
| WO | 2009086279 A2 | 7/2009 |
| WO | 2014100274 A1 | 6/2014 |
| WO | 2015099663 A1 | 7/2015 |
| WO | 2016014476 A1 | 1/2016 |
| WO | 2018004369 A1 | 1/2018 |

OTHER PUBLICATIONS

Holzhausen G.R. and Gooch R.P. Impedance of Hydraulic Fractures: Its Measurement and Use for Estimating Fracture Closure Pressure and Dimensions SPE-13892-MS, 1985, pp. 411-422.

Yilmaz O. and Doherty S.M. Seismic Data Analysis: Processing, Inversion and Interpretation of Seismic Data, 2000,16 pages.

Bogert B. P., Healy M. G. and Tukey J. W. The Quefrency Alanysis [sic] of Time Series for Echoes: Cepstrum, Pseudo Autocovariance, Cross-Cepstrum and Saphe Cracking, in Symposium on Time Series Analysis, New-York, 1963, p. 209-243.

Oppenheim A. V. and Schafer R. W., Digital Signal Processing, Prentice Hall, 1975, 7 pages.

Tribolet Jose M. and Oppenheim Alan V. Deconvolution of Seismic Data Using Homomorphic Filtering, Joint Auto. Control Conf., San Francisco, 1977, pp. 68-74.

Stoffa P.L., Buhl P. and Bryan P.L. The application of homomorphic deconvolution to shallow-water marine seismology,—Part I: Models, Geophysics,1974, p. 401-416.

Kanasewich E. R., Time Sequence Analysis in Geophysics, Third Edition, University of Alberta Press, 1974, pp. 355-360.

Autocorrelation, Wikipedia, 2017, downloaded Apr. 30, 2017 from https://en.wikipedia.org/wiki/Autocorrelation, 10 pages.

International Search Report and Written Opinion issued in International Patent Appl. No. PCT/US2016/061217 dated Mar. 6, 2017; 19 pages.

Laake e al., "A Generator for High Pressure Pulses in Liquids", Journal of Sound and Vibration, vol. 131, No. 2, 1989, pp. 295-304.

Echometer Company, "Gun-Microphone Assemblies for use with acoustic Liquid Level Instruments", 1995, 4 pages.

Raymond, "Hollow Glass Spheres under Pressure in the Ocean—Experiments Show Interesting Properties", IEEE Conf on Eng in the Ocean Environ and Mar Technol Soc, 11th Annu Meet, Proc; San Diego, CA, USA, Sep. 22-25, 1975, pp. 537-544.

Sercel, "Marine Sources, Ahead of the Curve", Brochure, Jan. 2011, pp. 2-28, France.

International Search Report and Written Opinion issued in PCT/US2016/066431 dated Apr. 3, 2017; 11 pages.

International search Report and Written Opinion issued in International Patent Applicaton No. PCT/US2016/061210 dated Feb. 21, 2017; 15 pages.

International search Report and Written Opinion issued in International Patent Application No. PCT/IB2011/050393 dated Oct. 6, 2011; 9 pages.

International Search Report and Written Opinion issued in International Patent Appl. No. PCT/US2016/061209 dated Feb. 16, 2017; 17 pages.

International Preliminary Report on Patentability issued in International Patent Appl. No. PCT/RU2016/000407 dated Jan. 10, 2019; 7 pages.

* cited by examiner

NOISE REDUCTION FOR TUBEWAVE MEASUREMENTS

CROSS REFERENCE TO RELATED APPLICATION(S)

None.

BACKGROUND

The analysis of tubewaves or pressure waves and/or their echoes can detect a fracture bottom irregularity, or other features in a well. Several references describe the analysis of pressure wave reflections, such as US 2011/0267922, US 2012/0018150, U.S. Pat. No. 6,192,3216, and U.S. Pat. No. 7,819,188.

Noise in the well system can obscure pressure wave measurements, or require the use of higher amplitude pressure signals for an appropriate signal-to-noise ratio. The piping system resonances, as well as the pressure fluctuations from plunger pumps, can interfere with or obscure pressure signal measurements. For example, significant resonances in piping and wellbores can damage equipment and interfere with treatment operations. As another example, the pressure fluctuation of a triplex pump pumping treatment fluid at 400 rpm has a frequency of 20 Hz that can interfere with pressure wave measurements.

In the past, the treating lines on fracturing missile trailers have had resonant frequencies that were excited by the triplex pumps, producing stress fluctuations in the treating lines and eventually fatigue failures. One solution to this problem involved fitting each missile trailer inlet with one of three sizes of converging-diverging nozzles, referred to herein as sonic chokes. These chokes dissipated roughly 700 kPa (about 100 psi) at their design flow rate, and along with other design changes, made the treating lines less sensitive to fatigue damage and eliminated this class of failure.

For duplex "mud" or drilling fluid pumps, gas-filled rubber bladders have been applied to both the suction and discharge sides in an effort to reduce pressure fluctuations associated with single and double acting pumps, which produce much larger pulsations than the triplex pumps commonly employed in portable oilfield pumping. While effective where they can be used, these dampers are impractical to apply to severe services where significant abrasives, high pressure, and/or aggressive fluids are employed. The available dampers are only rated up to 70 MPa (10,000 psi), and would fail rapidly when exposed to the complex acids and hydrocarbons employed in fracturing. Further, constructing such a device in a 100 MPa (15,000 psi) rating would entail a radical increase in wall thickness.

Moreover, gas-filled rubber bladder systems are very limited in the range of the ratio of pumping pressure to gas pre-charge that they can support. For example, a 3:1 ratio between the pre-charge pressure and the maximum reliable operating pressure represents a good ratio; in which case a damper that will be pressure tested to 100 MPa (15,000 psi) is charged to at least 3.5 MPa (5,000 psi). With this pre-charge, however, the damper will have no effect at all below 3.5 MPa (5,000 psi), whereas the optimum charge for damping is around 80% of the operating pressure for a bladder type damper. Moreover, the bladders require adjustment from job to job, rather than being set up and left in service. Thus, such a system has significant limitations that make it impractical for most fracturing operations.

The industry has an ongoing need for the development or improvement of noise reduction methods and systems to facilitate pressure wave measurements.

SUMMARY OF DISCLOSURE

In some embodiments according to the present disclosure, in a system or method for detecting the pressure wave signal or a response to the signal, one or more lateral branches operate to cancel pressure wave noise, and/or to amplify or filter a pressure wave signal. In some embodiments, lateral branches are pipe stubs or loops from ordinary piping components.

In some embodiments according to the present disclosure, a pressure wave system comprises a fluid filled tubular member to propagate a pressure wave, a signal source to generate a pressure wave signal in the tubular member, a sensor to receive the pressure wave signal, a response to the pressure wave signal, or a combination thereof, a source of pressure noise connected to the fluid-filled tubular member, and a noise interference system comprising a lateral branch operatively connected to the tubular member to cancel at least a portion of the pressure noise, amplify the pressure wave signal, filter the pressure wave signal, or a combination thereof.

In some embodiments according to this disclosure, a pressure wave system comprises a liquid filled wellbore adapted to propagate a pressure wave; a signal source to generate a pressure wave signal in the wellbore at a first frequency; a sensor to receive the pressure wave signal, a response to the pressure wave signal, or a combination thereof; a plunger pumping unit associated with noise generation at a second frequency different than the first frequency; a transfer line to supply a treatment fluid from the pumping unit to the wellbore; a flow resistance element in the transfer line; and a noise reduction system comprising a plurality of pipe stubs connected to the transfer line upstream of the flow resistance element and having a like plurality of respective resonant frequencies selected from frequencies matching the second frequency and whole multiples of the second frequency.

In some embodiments according to this disclosure, a pressure wave system comprises a liquid filled wellbore adapted to propagate a pressure wave; a signal source to generate a pressure wave signal in the wellbore at a first frequency; a sensor to receive the pressure wave signal, a response to the pressure wave signal, or a combination thereof; a plunger pumping unit associated with noise generation at a second frequency different than the first frequency; a transfer line to supply a treatment fluid from the pumping unit to the wellbore; a flow resistance element in the transfer line; and a parallel line having opposite ends fluidly connected to the transfer line upstream and downstream of the flow resistance element, and having a length selected from lengths matching one-half wavelength of the second frequency and whole multiples of the one-half wavelength.

In some embodiments according to this disclosure, a method to suppress noise in a pressure wave detection system comprises generating a pressure wave signal to propagate a pressure wave in a fluid filled tubular system; receiving the pressure wave signal, a response to the pressure wave signal, or a combination thereof; introducing pressure wave noise in the fluid-filled tubular system; and connecting a stub to the fluid-filled tubular system to cancel at least a portion of the pressure noise.

In some embodiments according to this disclosure, a method to suppress noise in a wellbore pressure wave detection system comprises generating a pressure wave signal to propagate a pressure wave in a fluid filled tubular system; receiving the pressure wave signal, a response to the pressure wave signal, or a combination thereof; introducing pressure wave noise into a flow line fluidly connected to the fluid-filled tubular system; restricting flow at a resistance element [[preferably sonic choke]] in the flow line; connecting opposite ends of a parallel line to the flow line upstream and downstream of the resistance element; and matching a length of the parallel line to a length selected from one-half wavelength of the pressure wave noise and whole multiples of the one-half wavelength.

In some embodiments according to this disclosure, a method to suppress noise in a wellbore pressure wave detection system comprises pumping treatment fluid through a flow line into a wellbore; generating a pressure wave signal at a first frequency to propagate a pressure wave in the wellbore; generating pressure wave noise at a second frequency into the flow line, wherein the first and second frequencies are different; restricting flow at a resistance element in the flow line; connecting to the flow line upstream from the resistance element, a plurality of stubs having a like plurality of respective resonant frequencies selected from frequencies matching the second frequency and whole multiples of the second frequency, to filter the pressure wave noise; and receiving the pressure wave signal, a response to the pressure wave signal, or a combination thereof.

In some embodiments according to this disclosure, a pressure wave system comprises a liquid filled wellbore adapted to propagate a pressure wave; a signal source to generate a pressure wave signal in the wellbore at a first frequency; a sensor to receive the pressure wave signal, a response to the pressure wave signal, or a combination thereof; a plunger pumping unit associated with noise generation at a second frequency different than the first frequency; a transfer line to supply a treatment fluid from the pumping unit to the wellbore; a flow resistance element in the transfer line; and a noise reduction system comprising a plurality of Helmholtz resonators connected to the transfer line upstream of the flow resistance element and having a like plurality of respective resonant frequencies selected from frequencies matching the second frequency and whole multiples of the second frequency.

In some embodiments according to this disclosure, a method to suppress noise in a wellbore pressure wave detection system comprises pumping treatment fluid through a flow line into a wellbore; generating a pressure wave signal at a first frequency to propagate a pressure wave in the wellbore; generating pressure wave noise at a second frequency into the flow line, wherein the first and second frequencies are different; restricting flow at a resistance element in the flow line; connecting to the flow line upstream from the resistance element, a plurality of Helmholtz resonators having a like plurality of respective resonant frequencies selected from frequencies matching the second frequency and whole multiples of the second frequency, to filter the pressure wave noise; and receiving the pressure wave signal, a response to the pressure wave signal, or a combination thereof.

In some embodiments according to this disclosure, a pressure wave system comprises a fluid filled tubular member to propagate a pressure wave; a signal source to generate a pressure wave signal in the tubular member; a sensor to receive the pressure wave signal, a response to the pressure wave signal, or a combination thereof; a source of pressure noise connected to the fluid-filled tubular member; and a noise interference system comprising a lateral branch operatively connected to the tubular member to cancel at least a portion of the pressure noise, amplify the pressure wave signal, filter the pressure wave signal, or a combination thereof.

In some embodiments according to this disclosure, a pressure wave system comprises a fluid filled wellbore adapted to propagate a pressure wave; a signal source to generate a pressure wave signal in the wellbore at a first frequency; a sensor to receive the pressure wave signal, a response to the pressure wave signal, or a combination thereof; a transfer line to supply a treatment fluid from a pumping unit to the wellbore; a pipe coupling fluidly connected at one end to the signal source and at the other end to a pipe joint in the transfer line; and a pipe stub fluidly connected to the pipe joint opposite the pipe coupling and coaxial therewith to acoustically pair the pipe coupling to the pipe stub and together form a spaced-pair pressure wave resonator.

In some embodiments according to this disclosure, a method to introduce a pressure wave signal for propagation in a fluid filled tubular system comprises fluidly connecting a pressure wave signal source to a pipe coupling; fluidly connecting the pipe coupling transversely to a pipe joint; operatively connecting the pipe joint in fluid communication with the fluid filled tubular system; connecting a stub to the pipe joint opposite the pipe coupling in axial alignment therewith to acoustically pair the pipe coupling to the stub and together form a spaced-pair resonator; generating a pressure wave signal from the signal source; and conditioning the pressure wave signal in the spaced-pair resonator.

Other aspects and advantages of the disclosure will be apparent from the following description and the appended claims.

GLOSSARY

Figure 1:
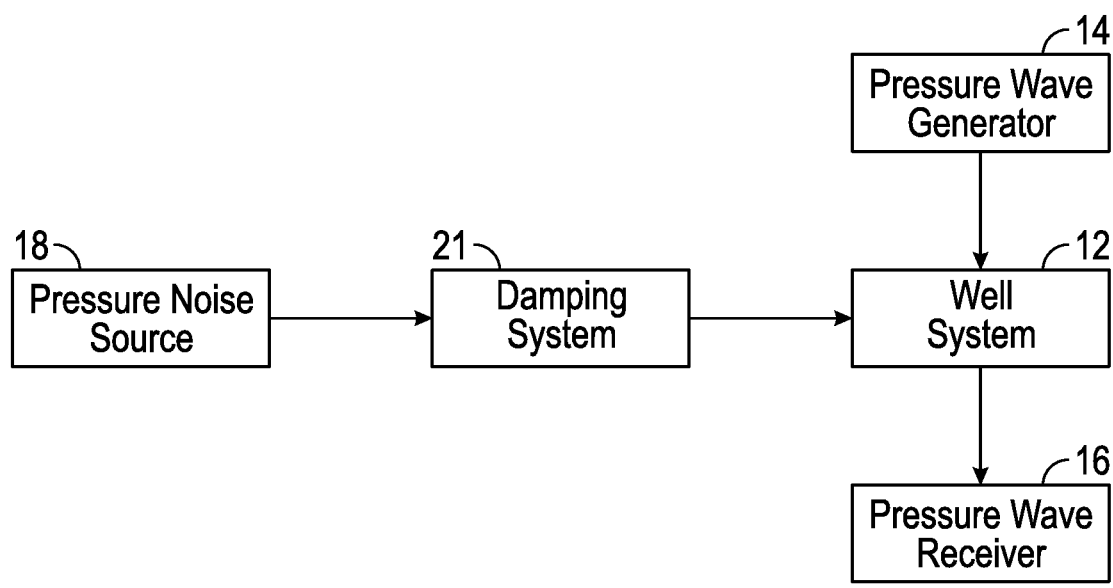
FIG. 1 is a schematic diagram of a pressure wave system in accordance with some embodiments of the present disclosure.

"Above", "upper", "heel" and like terms in reference to a well, wellbore, tool, formation, refer to the relative direction or location near or going toward or on the surface side of the device, item, flow or other reference point, whereas "below", "lower", "toe" and like terms, refer to the relative direction or location near or going toward or on the bottom hole side of the device, item, flow or other reference point, regardless of the actual physical orientation of the well or wellbore, e.g., in vertical, horizontal, downwardly and/or upwardly sloped sections thereof.

Acoustic—relating to vibrations that travel through a medium.

Adapted to—made suitable for a use or purpose; modified.

Adjacent—at or near; next to.

Analyze—to study closely and carefully.

The term "and/or" refers to both the inclusive "and" case and the exclusive "or" case, whereas the term "and or" refers to the inclusive "and" case only and such terms are used herein for brevity. For example, a component comprising "A and/or B" may comprise A alone, B alone, or both A and B; and a component comprising "A and or B" may comprise A alone, or both A and B.

Annulus—a ring-like figure, structure, part, marking, area or region, such as the space between the inside surface of a large pipe and the outside surface of smaller tubing or pipe within the large pipe.

Borehole or wellbore—the portion of the well extending from the Earth's surface formed by or as if by drilling, i.e., the wellbore itself, including the cased and openhole or uncased portions of the well.

Carrying—adapted to move while supporting.

Casing/casing string—large-diameter pipe lowered into an open hole and cemented in place.

Cluster—a collection of data points with similar characteristics.

Coiled tubing/tubing string—a well operation or system employing a long continuous length of pipe wound and unwound from a spool to lower and raise downhole tools; the continuous length of pipe used in such operations.

Confirm—to make sure or demonstrate that something is true, accurate, or justified; verify; substantiate.

Coupling—combining, linking or joining two things together.

Coupling, acoustic—a the combining, linking or joining two things together to cooperate in an acoustic property or feature, such as sound transmission or resonance.

Deconvoluting—algorithmic processing to reverse the effects of convolution on recorded data.

Degradable—a material capable of breaking down, or chemically deteriorating, or changing state as by dissolution, sublimation or melting.

Degradation conditions—conditions at which the process of degrading a degradable material can initiate or continue.

As used herein, a degradable diverter placed in a flow passage has "substantially degraded" when the process of degrading has progressed to the point where fluid can readily pass through the flow path.

Depth—includes horizontal/lateral distance/displacement.

Derived (data)—obtained from a specified source. For the avoidance of doubt, data derived from a specified source may comprise or consist of the original data per se.

Determine—to establish or ascertain definitely, as after consideration, investigation, or calculation.

Diversion—the act of causing something to turn or flow in a different direction.

Diversion material—a substance or agent used to achieve diversion during stimulation or similar injection treatment; a chemical diverter.

Diversion pill—a relatively small quantity of a special treatment fluid blend used to direct or divert the flow of a treatment fluid.

Divert—to cause something to turn or flow in a different direction.

Diverter—anything used in a well to cause something to turn or flow in a different direction, e.g., a diversion material or mechanical device; a solid or fluid that may plug or fill, either partially or fully, a portion of a subterranean formation.

Each—used to refer to every one of two or more things, regarded and identified separately.

Element, flow resistance—any device or feature in a pipe or other fluid passage that increases the flow resistance, such as a restriction or narrowed section.

Embodiments—non-limiting tangible or visible forms of an idea or quality according to the present disclosure or invention.

"Emission location" as used herein refers to the point of origin or entry of a wave into the fluid in the main wellbore passage or annulus interfacing the casing or interior surface of the wellbore in an open completion, e.g., the transducer of a downhole emitter locally coupled to the wellbore fluid, the end or other opening of a coiled tubing that conducts a pressure wave via a fluid filling the coiled tubing from a remote pressure wave generator, etc. For purposes of the present disclosure and claims, an emitter is deemed to be in the well at the emission location even if the tubewave generation originates from a device located wholly or partially outside the wellbore.

Emit—to send out from a source.

Emitter—a device that emits something.

End—the furthest or most extreme part of something.

End, closed—an end that is not open; in pressure wave behavior, an end with low compliance producing a positive echo from a positive signal.

End, open—an end that allows access or passage through; an end that is not blocked; in pressure wave behavior, an end with high compliance producing a negative echo from a positive signal.

Feature—a distinctive attribute or aspect of something.

Fixed—predetermined and not subject to change.

Flow path—a passageway, conduit, porous material or the like through which fluid may pass.

Fluid communication—connection via a flow path.

Fluid hammer—a pressure surge or wave caused when a fluid in motion is suddenly forced to stop or change direction.

Formation—a body of rock that is sufficiently distinctive and continuous that it can be mapped, or more generally, the rock around a borehole.

Fracture—a crack or surface of breakage within rock.

Fracture zone—an interval having one or more fractures treated concurrently, e.g., fractures associated with a perforation cluster and/or treated in the same stage.

Frequency—the rate at which something occurs, e.g., in a wave.

Frequency, resonant—a frequency capable of exciting a resonance maximum in a given body or system; a natural frequency of vibration determined by the physical parameters of the vibrating object.

Hydraulic fracturing or "fracturing"—a stimulation treatment involving pumping a treatment fluid at high pressure into a well to cause a fracture to open.

Initiate—to cause a process or action to begin.

Injection—pumping fluid through the wellbore into the reservoir for storage or to maintain pressure and/or in a flooding operation.

Instantaneous shut-in pressure or ISIP—the shut-in pressure immediately following the cessation of the pumping of a fluid into a well.

Interval—a space between two points or times, e.g., the space between two points in a well.

Lateral—a branch of a well radiating from the main borehole.

Length—the measurement or extent of something from end to end; the greater of two or the greatest of three dimensions of a body.

Length, acoustic—the length of a resonant element corresponding to one-half wavelength of the resonant frequency; the physical length of the resonant element adjusted for end effects.

Line—a length of cord, rope, wire, or other material serving a particular purpose, such as pipe or tubing used to transmit flow, sound, light, etc. or cables or wires used to transmit electrical current.

Liner—a casing string that does not extend to the top of the wellbore, but instead is anchored or suspended from inside the bottom of the previous casing string.

Map—make a diagrammatic representation of an area or region indicating physical features.

Match—noun: things that correspond or are very similar in some essential respect; verb: correspond or cause to correspond in some essential respect. For purposes herein, acoustic properties such as acoustic length or resonant frequency are considered to be matched when the combination of corresponding waves results in an increase or decrease in the amplitude of the greater wave by at least 50% of the amplitude of the lesser wave.

Measure—to ascertain the value, number, quantity, extent, size, amount, degree, or other property of something by using an instrument or device.

Modify—to make partial or minor changes to (something), typically so as to improve it or to make it less extreme.

Monitor—to observe, record or detect the progress or quality of something over a period of time; keep under systematic review for purposes of control or surveillance.

Noise—fluctuations that accompany a signal that tend to obscure it.

Noise, pressure or pressure wave—pressure fluctuations that tend to obscure detection of a sound.

Overlapping—partly coinciding in time or spatial dimension(s).

Pair—a set of two things used together or regarded as a unit.

Parallel—side by side objects having the same distance continuously between them.

Parallel lines—lengths of pipe, tubing, cable or other lines connected together and used to transmit, e.g., flow or sound, between the connections.

Partition—a structure dividing a space into two parts.

Perforation—the communication tunnel created from the casing or liner into the reservoir formation, through which fluids may flow, e.g., for stimulation and/or oil or gas production.

Perforation cluster—a group of nearby perforations having similar characteristics.

Pill—any relatively small quantity of a special blend of drilling or treatment fluid to accomplish a specific task that the regular drilling or treatment fluid cannot perform.

Pipe—a tube of metal, plastic, or other material used to convey or contain water, gas, oil, or other fluid substances.

Pressure signal emitter—a non-pumping device specially adapted to form a pressure wave in a wellbore, usually in communication with the high pressure side (outlet or discharge) of a fluid pump.

Progression—a movement or development toward a destination or a more advanced state, especially gradually or in stages; a succession; a series.

Propagate—to cause to move in some direction or through a medium.

Proppant—particles mixed with treatment fluid to hold fractures open after a hydraulic fracturing treatment.

Proppant pumping schedule—a pumping sequence comprising the volume, rate, and composition and concentration of a proppant-laden fluid, and any associated treatment fluids such as an optional pad, optional spacers, and an optional flush.

Receive—to convert a signal to a file, sound, visual display or other perceptible medium.

Receiver—an electrical or computer apparatus that converts a signal to a file, sound, visual display or other perceptible medium.

"Receiving location" as used herein refers to the point in the wellbore fluid from whence the signal is received, e.g., at the transducer of a downhole receiver where it is coupled to the wellbore fluid. For purposes herein a distributed sensor cable is considered to provide a receiving location at all points along the extent of the cable capable of sensing a signal.

Reference, downhole—the lowermost plug or end of a wellbore from which substantially all of a tubewave is reflected, e.g. a bridge plug or the bottom of the wellbore.

Refracturing or refrac—fracturing a portion of a previously fractured well after an initial period of production. The fractures from the earlier treatment are called "pre-existing fractures".

Reflector—an object or device that reflects radio waves, seismic vibrations, sound, or other waves Regularly changing frequency—a frequency (cycles per time) that varies in an ordered pattern.

Remote—distant or far away.

Reservoir—a subsurface body of rock having sufficient porosity and permeability to store and transmit fluids.

Resistance, flow—the forces preventing or retarding the passage of a fluid; the inverse of conductivity.

Resonance—the reinforcement or prolongation of sound by reflection, e.g., from a surface, or by the synchronous vibration of a neighboring object.

Respective—belonging or relating separately to each of two or more things.

Response—the reaction resulting from a stimulus.

Re-stimulation—stimulation treatment of any portion of a well, including any lateral, which has previously been stimulated.

Revise—alter in light of developments.

Sending—cause (a message or computer file) to be transmitted electronically.

Sensing—automatically detecting or measuring something.

Sensor—a device that detects or measures a physical property and records, indicates or otherwise responds to it.

Shut in—closing a wellbore at the surface, e.g., at or near the Christmas tree, blowout preventer stack Shut-in pressure or SIP—the surface force per unit area exerted at the top of a wellbore when it is closed, e.g., at the Christmas tree or BOP stack.

As used herein, "sign" refers to the mathematical character of a number or the direction of a wave, viz. whether positive (greater than zero or the same direction as a reference) or negative (less than zero or a different direction with respect to a reference).

Signal—an acoustic, physical, chemical, electrical, electromagnetic, or other impulse transmitted or received.

Simulate—to create a representation or model of something, e.g., a physical system or particular situation.

Stage—a pumping sequence comprising a proppant pumping schedule and a diversion pill pumping schedule, including pads, spacers, flushes and associated treatment fluids.

Stimulation—treatment of a well to enhance production of oil or gas, e.g., fracturing, acidizing, and so on.

Surface—the surface of the Earth.

Surface (thing)—something positioned or performed at the surface of the Earth.

Sweep circuit—an electronic or mechanical device which creates a waveform with a regularly changing frequency or amplitude, usually a linearly varying frequency and a constant amplitude.

Tandem—having two things arranged one in front of the other.

Tractor—a powered vehicle with wheels or treads used to haul or move equipment.

Treatment—the act of applying a process or substance to something to give it particular properties.

Treatment fluid—a fluid designed and prepared to resolve a specific wellbore or reservoir condition.

Tubewave—a periodic pressure disturbance in which alternating compression and rarefaction are propagated through or on the surface of a medium without translation of the material; also known as a pressure wave or Stonely wave.

Volume—the amount of space that a substance or object occupies, or that is enclosed within a container.

Wave, pressure—the pattern in which pressure fluctuations spread; sound wave.

Well—a deep hole or shaft sunk into the earth, e.g., to obtain water, oil, gas, or brine.

Whole—a whole number; an integer.

Wireline—a well operation or system employing single-strand or multi-strand wire or cable to lower and raise downhole tools; the wire or cable used in such operations.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible. At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Some embodiments of the present disclosure relate to methods, systems, and/or tools for the generation, conditioning, detection, processing and/or analysis of tubewaves, which are also referred to herein as pressure waves, e.g., to identify open fracture zones in a well and determine the location at which they intercept the wellbore, before, during, and/or after a well treatment, e.g., a well stimulation operation such as a fracturing or refracturing treatment. In some embodiments according to the present disclosure, in a system or method for detecting the pressure wave signal or a response to the signal, one or more lateral branches operate to cancel pressure wave noise, and/or to amplify or filter a pressure wave signal. In some embodiments, the lateral branches are pipe stubs or loops.

In some embodiments of the present disclosure, a pressure wave system, comprises: a fluid filled tubular member to propagate a pressure wave; a signal source to generate a pressure wave signal in the tubular member; a sensor to receive the pressure wave signal, a response to the pressure wave signal, or a combination thereof; a source of pressure noise connected to the fluid-filled tubular member; and a noise interference system comprising a lateral branch operatively connected to the tubular member to cancel at least a portion of the pressure noise, amplify the pressure wave signal, filter the pressure wave signal, or a combination thereof.

In some embodiments, the tubular member comprises a well, the fluid comprises liquid, and/or the noise source comprises a pump. In some embodiments, the lateral branch is connected to the tubular member or well to cancel at least a portion of the pressure noise.

In some embodiments, the lateral branch comprises a piping stub comprising a resonant frequency matching the noise. In some embodiments, the piping stub has an acoustic length matching one-half wavelength of the noise or a whole multiple of the one-half wavelength, e.g., 0.5, 1, 1.5, 2, 2.5 wavelengths and so on. In general, the product of the wavelength λ and the frequency f is equal to the speed v of the pressure wave, i.e., the speed of sound in the fluid medium: $f*\lambda=v$.

In some embodiments, the piping stub has an acoustic length matching one-quarter wavelength of the noise and/or an odd multiple thereof, where the piping stub has an open-end condition, such as, for example, a gas bubble or enlarged pipe or tank.

In some embodiments, the noise interference system comprises a plurality of the resonance-matching piping stubs of different acoustic lengths. In some embodiments, the different acoustic lengths match a combination of lengths selected from one-half wavelength of the noise and whole multiples of the one-half wavelength.

In some embodiments, the system comprises a piston in the piping stub to adjust the resonant frequency, e.g., where the frequency of the noise may change, such as when the speed of a pump is changed, the effective length can be adjusted or tuned in response.

In some embodiments, the system comprises a flow resistance element, such as, for example, a sonic choke in a piping connection between the noise source and the tubular member. In some embodiments, the lateral branch is connected on an approach to the choke from the noise source.

In some embodiments, the interference system comprises a plurality of the lateral branches on the approach to the sonic choke or other flow resistance element. In some embodiments, the lateral branches comprise respective resonance-matching piping stubs of different lengths, and or the different lengths match a combination of lengths selected from one-half wavelength of the noise and whole multiples of the one-half wavelength.

In some embodiments, the lateral branch comprises a parallel line, e.g., a flow line, around the sonic choke or other flow resistance element, and or the parallel line has a length selected from one-half wavelength of the noise and whole multiples of the one-half wavelength.

In some embodiments, the lateral branch comprises a fluid partition acoustically coupling a captive fluid disposed in the lateral branch, to the fluid in the tubular member. In some embodiments, the fluid partition is selected from a diaphragm, a sliding piston, a bag, a floating element, or a combination thereof, and so on. In some embodiments, the captive fluid comprises a relatively compressible fluid having a higher compressibility than the fluid filling the tubular member, a relatively high density fluid having a density higher than the fluid filling the tubular member, or a combination thereof.

In some embodiments, the lateral branch comprises a riser attached to the connection between the noise source and the tubular member to promote solid settling from the lateral branch into the connection. In some embodiments, the lateral branch further comprises one or more bends in a run connected to an upper end of the riser and or one or more upright and/or horizontal runs connected to respective bends.

In some embodiments, a pressure wave system comprises a liquid filled wellbore adapted to propagate a pressure wave; a signal source to generate a pressure wave signal in the wellbore at a first frequency; a sensor to receive the pressure wave signal, a response to the pressure wave signal, or a combination thereof; a plunger pumping unit associated with noise generation at a second frequency different than the first frequency; a transfer line to supply a treatment fluid from the pumping unit to the wellbore; a flow resistance element in the transfer line; and a noise reduction system comprising a plurality of pipe stubs connected to the transfer line upstream of the flow resistance element and having a like plurality of respective resonant frequencies selected from frequencies matching the second frequency and whole multiples of the second frequency. In some embodiments, the pipe stubs comprise respective lengths selected from lengths matching one-half wavelength of the second frequency and whole multiples of the one-half wavelength. In some embodiments, the flow resistance element comprises a sonic choke.

In some embodiments, a pressure wave system comprises a liquid filled wellbore adapted to propagate a pressure wave; a signal source to generate a pressure wave signal in the wellbore at a first frequency; a sensor to receive the pressure wave signal, a response to the pressure wave signal, or a combination thereof; a plunger pumping unit associated with noise generation at a second frequency different than the first frequency; a transfer line to supply a treatment fluid from the pumping unit to the wellbore; a flow resistance element in the transfer line; and a parallel line having opposite ends fluidly connected to the transfer line upstream and downstream of the flow resistance element, and having a length selected from lengths matching one-half wavelength of the second frequency and whole multiples of the one-half wavelength.

In some embodiments, a method to suppress noise in a pressure wave detection system comprises generating a pressure wave signal to propagate a pressure wave in a fluid filled tubular system; receiving the pressure wave signal, a response to the pressure wave signal, or a combination thereof; introducing pressure wave noise in the fluid-filled tubular system; and connecting a stub to the fluid-filled tubular system to cancel at least a portion of the pressure noise.

In some embodiments, the method includes matching a resonant frequency of the stub to the pressure wave noise, and/or tuning or adjusting a resonant frequency of the stub to match the pressure wave noise. In some embodiments, the method includes matching a length of the stub to one-half wavelength of the pressure wave noise or a whole multiple of the one-half wavelength of the pressure wave noise. In some embodiments, the method includes matching a length of the stub to one-quarter wavelength of the pressure wave noise or an odd whole multiple of the one-quarter wavelength of the pressure wave noise. In some embodiments, the method includes connecting a plurality of the stubs to the fluid-filled tubular system.

In some embodiments, the method further includes introducing the pressure wave noise through a flow line connected to the fluid-filled tubular system, restricting flow at a resistance element, e.g. a sonic choke in the flow line, and/or connecting the stub to the flow line upstream from the resistance element.

In some embodiments, the method further includes partitioning captive fluid in the stub from the fluid in the tubular system and acoustically coupling the captive fluid to the fluid in the tubular member.

In some embodiments, the method further includes extending the effective acoustic length of the stub by filling the stub with a fluid having a higher compressibility, a higher density, or a combination thereof, relative to the fluid filling the tubular member or the like.

In some embodiments, the method further includes gravity settling solids from an upright section of the stub emptying through the connection to the tubular system, e.g., orienting the stub vertically with respect to its connection to a line can to inhibit solids accumulation in the stub. In some embodiments, the method further includes fluidly connecting one or more bends to an upper end of the upright section of the stub, and one or more upright, horizontal, or combination of upright and horizontal runs.

In some embodiments according to this disclosure, a method to suppress noise in a wellbore pressure wave detection system comprises generating a pressure wave signal to propagate a pressure wave in a fluid filled tubular system; receiving the pressure wave signal, a response to the pressure wave signal, or a combination thereof; introducing pressure wave noise into a flow line fluidly connected to the fluid-filled tubular system; restricting flow at a sonic choke or other resistance element in the flow line; connecting opposite ends of a parallel line to the flow line upstream and downstream of the resistance element; and matching a length of the parallel line to a length selected from one-half wavelength of the pressure wave noise and whole multiples of the one-half wavelength.

In some embodiments according to this disclosure, a method to suppress noise in a wellbore pressure wave detection system comprises pumping treatment fluid through a flow line into a wellbore; generating a pressure wave signal at a first frequency to propagate a pressure wave in the wellbore; generating pressure wave noise at a second frequency into the flow line, wherein the first and second frequencies are different; restricting flow at a resistance element in the flow line; connecting to the flow line upstream from the resistance element, a plurality of stubs having a like plurality of respective resonant frequencies selected from frequencies matching the second frequency and whole multiples of the second frequency, to filter the pressure wave noise; and receiving the pressure wave signal, a response to the pressure wave signal, or a combination thereof.

In some embodiments according to this disclosure, a pressure wave system comprises a liquid filled wellbore adapted to propagate a pressure wave; a signal source to generate a pressure wave signal in the wellbore at a first frequency; a sensor to receive the pressure wave signal, a response to the pressure wave signal, or a combination thereof; a plunger pumping unit associated with noise generation at a second frequency different than the first frequency; a transfer line to supply a treatment fluid from the pumping unit to the wellbore; a flow resistance element in the transfer line; and a noise reduction system comprising a plurality of Helmholtz resonators connected to the transfer line upstream of the flow resistance element and having a like plurality of respective resonant frequencies selected from frequencies matching the second frequency and whole multiples of the second frequency.

In some embodiments according to this disclosure, a method to suppress noise in a wellbore pressure wave detection system comprises pumping treatment fluid through a flow line into a wellbore; generating a pressure wave signal at a first frequency to propagate a pressure wave in the wellbore; generating pressure wave noise at a second frequency into the flow line, wherein the first and second frequencies are different; restricting flow at a resistance element in the flow line; connecting to the flow line upstream from the resistance element, a plurality of Helmholtz resonators having a like plurality of respective resonant frequencies selected from frequencies matching the second frequency and whole multiples of the second frequency, to filter the pressure wave noise; and receiving the pressure wave signal, a response to the pressure wave signal, or a combination thereof.

In some embodiments according to this disclosure, a pressure wave system comprises a fluid filled tubular member to propagate a pressure wave; a signal source to generate a pressure wave signal in the tubular member; a sensor to receive the pressure wave signal, a response to the pressure wave signal, or a combination thereof; a source of pressure noise connected to the fluid-filled tubular member; and a noise interference system comprising a lateral branch operatively connected to the tubular member to cancel at least a portion of the pressure noise, amplify the pressure wave signal, filter the pressure wave signal, or a combination thereof.

In some embodiments, the signal source is attached to a pipe coupling connected to a pipe joint operatively connected to the tubular member, and the lateral branch is connected to the pipe joint opposite the pipe coupling to acoustically pair the pipe coupling to the later branch and together form a spaced-pair pressure wave resonator. In some embodiments, the pressure wave resonator has a resonant frequency to amplify the signal source, to cancel the pressure noise, or to filter a noise portion of the signal source having the resonant frequency.

In some embodiments according to this disclosure, a pressure wave system comprises a fluid filled wellbore adapted to propagate a pressure wave; a signal source to generate a pressure wave signal in the wellbore at a first frequency; a sensor to receive the pressure wave signal, a response to the pressure wave signal, or a combination thereof; a transfer line to supply a treatment fluid from a pumping unit to the wellbore; a pipe coupling fluidly connected at one end to the signal source and at the other end to a pipe joint in the transfer line; and a pipe stub fluidly connected to the pipe joint opposite the pipe coupling and coaxial therewith to acoustically pair the pipe coupling to the pipe stub and together form a spaced-pair pressure wave resonator.

In some embodiments, the spaced-pair pressure wave resonator has an acoustic length selected from lengths matching one-half wavelength of the first frequency and whole multiples of the one-half wavelength. In some embodiments, the system further comprises a source of pressure noise having a second frequency, wherein the spaced-pair pressure wave resonator has an acoustic length selected from lengths matching one-half wavelength of the second frequency and whole multiples of the one-half wavelength of the second frequency. In some embodiments, the first and second frequencies are different. In some embodiments, the pressure noise source comprises the signal source and the spaced-pair pressure wave resonator has a resonant frequency to filter the pressure noise.

In some embodiments according to this disclosure, a method to introduce a pressure wave signal for propagation in a fluid filled tubular system comprises fluidly connecting a pressure wave signal source to a pipe coupling; fluidly connecting the pipe coupling transversely to a pipe joint; operatively connecting the pipe joint in fluid communication with the fluid filled tubular system; connecting a stub to the pipe joint opposite the pipe coupling in axial alignment therewith to acoustically pair the pipe coupling to the stub and together form a spaced-pair resonator; generating a pressure wave signal from the signal source; and conditioning the pressure wave signal in the spaced-pair resonator.

In some embodiments, the method comprises matching the resonance of the spaced-pair resonator to the pressure wave signal and amplifying the pressure wave signal. In some embodiments, the method comprises matching the resonance of the spaced-pair resonator to noise in the pressure wave signal and filtering the noise from the pressure wave signal. In some embodiments, the method comprises generating pressure wave noise in the tubular system, matching the resonance of the spaced-pair resonator to the pressure wave noise and filtering the pressure wave noise.

In some embodiments, the pressure wave is reflected from a feature in a tubular member such as a fracture or plug in a wellbore, and the reflection is received at a receiver. In this manner, information regarding the location and/or a characteristic of the feature can be determined. The following discussion is in reference to a tubular member or system comprising a wellbore by way of an illustrative example, although the disclosure is not thereby limited.

When a pressure wave reflects from an interface or change in the tubular media such as a fracture zone or other feature, the response is a reflection related to the original wave, but modified by the character of the reflector. In some embodiments, the character of the reflection can be analyzed to determine the nature of the wellbore adjacent the reflector, e.g., whether or not the reflector is near a particular type of feature, and or the properties of the feature. For example, the reflection may be of one sign (positive or negative) when the reflector is adjacent to a fracture, and of an opposite sign when it is not. Furthermore, when the sign is indicative of the presence of a fracture, the character of the reflection may also indicate the degree of conductivity of the fracture, e.g., a strong reflection may indicate a relatively higher conductivity than a weaker reflection.

Two extreme types of pressure wave reflection are of interest in some embodiments: those of a closed end tube, and those of an open end. A closed end is one in which there is little or no compliance at the reflector; a capped pipe is an example of this. The reflection will have the same sign (positive) as the interrogating signal (positive). An open end, on the other hand, is one in which there is a large compliance at the reflector; a pipe ending in a large tank is an example of this. Such compliance can consist of a significant sealed volume of fluid, a free surface, or a connection to a reservoir, such as a hydrocarbon reservoir. The reflection from an open end terminator will have the opposite sign (negative) of the interrogating signal (positive).

In some embodiments, a resonant lateral branch having a closed end will reflect a negative echo into the main tube, thereby canceling out the positive signal at the resonant frequency, e.g. where the lateral branch has an acoustic length that is one-half the wavelength of the signal or a whole multiple thereof. Thus, by matching the resonant frequency of the lateral branch to the noise, the noise is effectively canceled out in these embodiments.

However, if the lateral branch has an open end, the reflection echo will be positive into the main tube, e.g., negative at the entry, and negative again at the open end reflection and thus positive at the return; and would instead tend to reinforce any signal or noise at its resonant frequency. For open end lateral branches, however, in some embodiments if the acoustic length is one-quarter of the wavelength of the noise or signal, or a whole multiple thereof, the echo is out of phase and the noise or signal can be canceled.

With reference to the figures wherein the last two digits in the numerals refer to like parts, FIG. 1 shows a pressure wave system 10 comprised of a fluid filled piping system 12 with a fluid-filled tubular member, such as a wellbore (see FIGS. 2-8), in which a pressure wave can be propagated. The fluid can be any fluid in which sound or pressure waves can travel, including gas, liquid, foam, energized fluid, mist, etc., such as, for example, a treatment fluid used in a treatment operation such as hydraulic fracturing or other well stimulation.

The system 10 includes a signal source or generator 14 acoustically or fluidly connected to generator a pressure wave in the piping system 12, and in some embodiments may also include a sensor or receiver 16 to receive the pressure wave signal, a response to the signal, or both. The generator 14 and receiver 16 may be located in or on the tubular member, piping leading to or from the tubular member, piping inside the tubular member such as coiled tubing or the like, or otherwise acoustically coupled to the piping system 12 for generating and receiving pressure waves.

In some embodiments, however, there may also be one or more sources 18 for pressure noise to enter the piping system 12, which can interfere with the generation, transmission, and/or reception of the pressure waves and/or echoes. Such noise sources can be a reciprocating machine such as a plunger pump, for example, and can originate within the piping system 12 itself, or be transmitted into the piping system from an external location. For example, a triplex pump operating at 400 rpm will generate a series of pressure waves at 20 Hz.

According to some embodiments of the present disclosure, the piping system 12 is provided with a noise interference or damping system 20, comprising a lateral branch (see FIGS. 2-9) operatively connected to the piping system 12 and thus the tubular member, to cancel at least a portion of the pressure noise from source 18, amplify the pressure wave signal from source 14, or filter the pressure wave signal from source 14, or a combination thereof, so that the receiver 16 receives modified pressure waves having less noise and/or a stronger or otherwise more easily discernible and/or detectable signal. The lateral branch(es) have a resonance that facilitates noise cancellation and/or signal amplification and/or filtering.

Figure 2:
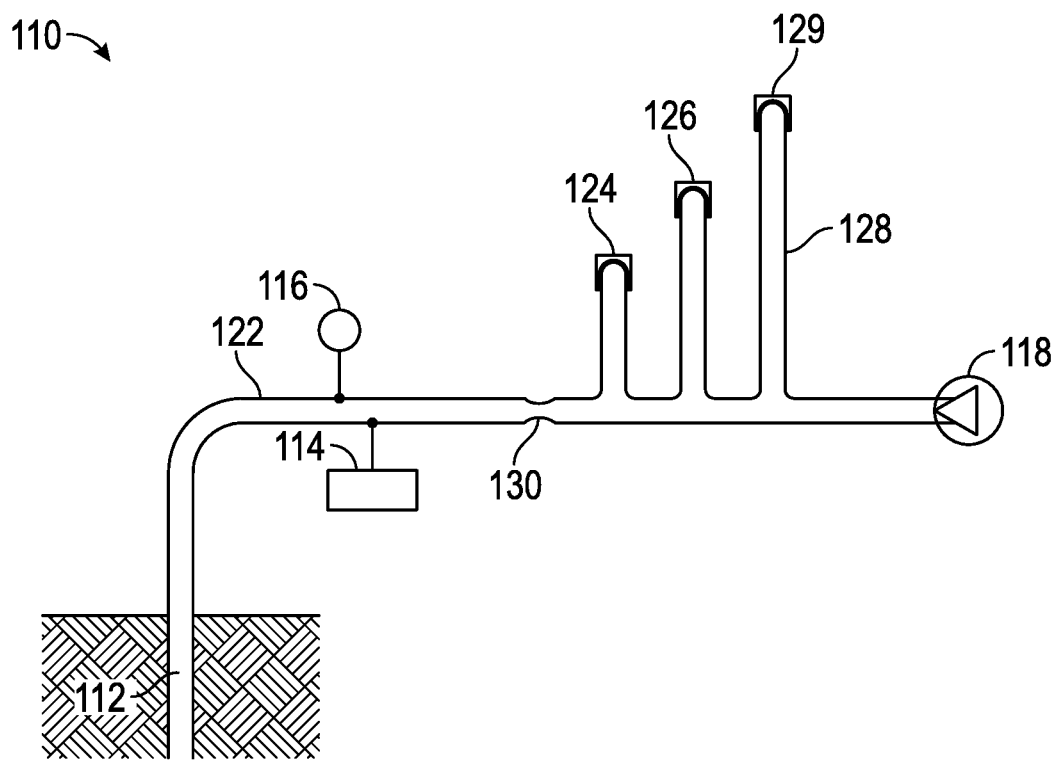
FIG. 2 is a schematic diagram of a pressure wave system with lateral branches in accordance with embodiments of the present disclosure.

FIG. 2 shows a system 110 having one or more pumps 118 delivering fracturing slurry or other oilfield fluids, to a main treating line 122 supplying the wellbore 112. The treating line 122 is shown terminating in well 112, though it may also terminate into a coiled tubing reel or cementing head. A pressure measurement system 116 and a signal source 114 are coupled to the main treating line 122. This description is likewise applicable to FIGS. 3-9.

In some embodiments, a set of three lateral branches in the form of pipe stubs 124, 126, 128 are shown, although there may be as few as one branch and as many as ten or more branches. The pipe stubs 124, 126, 128 are conveniently lengths of pipe with closed ends in the form of caps 129 connected to pipe tees in the main line 122. In some embodiments, a sonic choke 130 or other flow resistance element may be placed in the line 122 to improve attenuation of the system 110, e.g., with the generator 118 and/or receiver 116 on one side of the choke 130 downstream toward or in the wellbore 112, and the lateral branches 124, 126, 128 on the upstream side of the choke 130 from the pump 118. The resistance element 130 may be a relatively efficient converging/diverging nozzle, or a simple pipe. In some embodiments, the pipe stubs 124, 126, 128 have lengths chosen such that they resonate at a frequency which interacts, e.g., cancels, some selected pressure waves, e.g., noise, in the system 110. In embodiments, one or more branches may be connected to resonators to further refine the signals. This description is likewise applicable to corresponding resistance elements shown in FIGS. 3-9.

As an example, the speed of sound in water-based fluids is approximately 1450 m/s (4760 ft/s), and full crankshaft speed for a triplex frac pump is typically 60 rpm. This translates to a plunger frequency of 3 Hz. The most strong of the noise harmonics typically 12 and every third harmonic counted from it. (See FIG. 9 for spectrum of triplex pump running on low speed of about 30 rpm and highlighted harmonics). The 12 harmonics at 60 rpm is on 36 Hz. and a corresponding wavelength of 40 m (134 ft). Based on this, a lateral branch with a closed end that has an acoustic length equal to one-half of the wavelength would be 20 m (67 ft) long, plus or minus any end correction(s) that may be applicable. A branch having a matching acoustic length of 20 m would resonate at 36 Hz, corresponding to 12 harmonics of 60 rpm on the pumps 118, and thus provide attenuation at that frequency.

The "width" of the resonant peaks of the pipe stubs 124, 126, 128, i.e., the variation in noise frequencies from the peak resonance that can be canceled, depends on the damping in the system 110; more damping provides less attenuation but a wider range of frequencies that are attenuated. Other stub 124, 126, 128 acoustic lengths of interest are whole multiples of one acoustic length, e.g., 2, 3, 4, 5 acoustic lengths and so on, or 1, 1.5, 2, 2.5 one-half wavelengths, etc., or if end correction is negligible, actual stub lengths of 4.19 m, 8.38 m, 12.57 m, 16.76 m, 20.95 m for this example.

In some embodiments, the stubs 124, 126, 128 may have a quarter wavelength, but a provided with an open end condition. An open end condition can be delivered by a gas bubble or a large enough liquid volume, e.g., a Helmholtz resonator (see FIG. 4).

Figure 3:
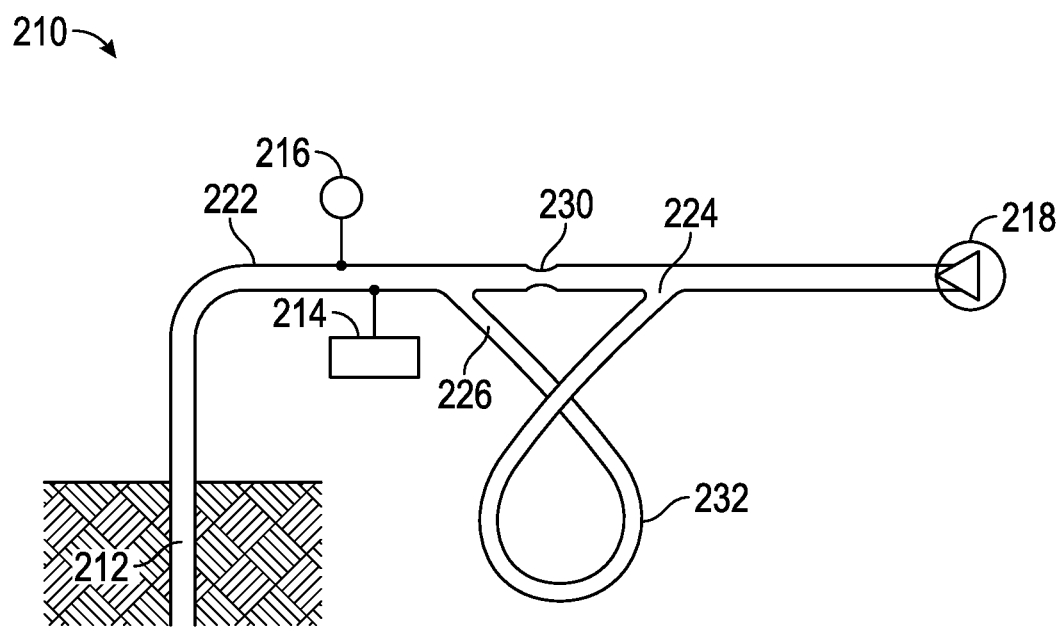
FIG. 3 is a schematic diagram of a pressure wave system with a parallel flow line in accordance with embodiments of the present disclosure.

FIG. 3 similarly shows a system 210 having one or more pumps 218 delivering fluids to a main treating line 222 supplying the wellbore 212, with a pressure measurement system 216 and a signal source 214 coupled to the main treating line 222 downstream from the choke 230 or other flow resistance element, as in FIG. 2. A lateral branch 224 is connected upstream of choke 230, another lateral branch 226 is connected downstream from the choke 230, and a flow line or loop 232 connects the branches 224, 226 together. The branches 224, 226 may be simple pipe tees; and the loop 232 is designed with a length such that the pressure wave transit time through it is approximately one half of the wavelength to be attenuated. An incoming wave train enters the lateral 224 and part of it goes through each port. After the resistive element 230, the two waves are re-assembled at the lateral 226. For some frequencies, the delayed wave will be shifted by a half wave length, and the sum of the two will be zero. This arrangement of treating iron is particularly attractive because the frac fluid can flow through all of the pipe work, thus avoiding sand settling out in the system.

Figure 4:
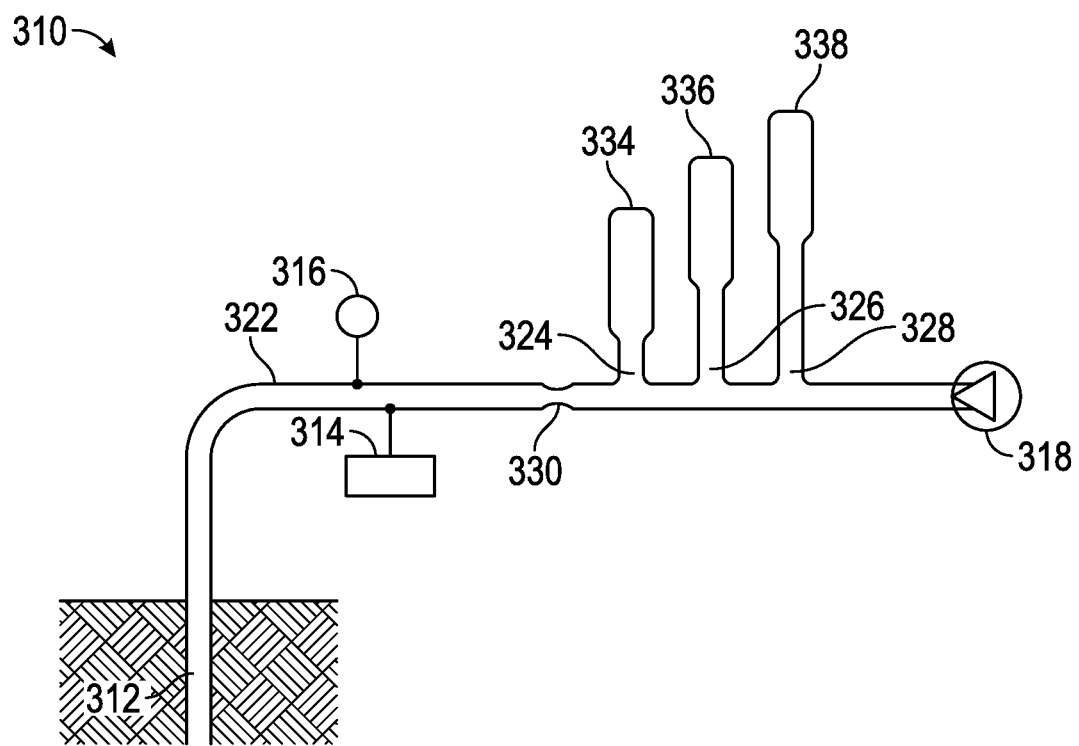
FIG. 4 is a schematic diagram of a pressure wave system with Helmholtz resonators in accordance with embodiments of the present disclosure.

FIG. 4 similarly shows a system 310 having one or more pumps 318 delivering fluids to a main treating line 322 supplying the wellbore 312, with a pressure measurement system 316 and a signal source 314 coupled to the main treating line 322 downstream from the choke 330 or other flow resistance element, as in FIGS. 2-3. In these embodiments lateral branches 324, 326, and 328 are connected to an array of three Helmholtz resonators 334, 336, 338. These lateral branches 324, 326, and 328 comprise a section of pipe that may be smaller than the main treating line 322, and a section of larger pipes 334, 336, 338. The coupling pipes 324, 326, 328 act as a mass, resonating against the spring of the compliance of the larger pipes 334, 336, 338. This system 310 allows the overall pipe length to be decoupled from the desired wavelengths. Additional resonances will also be created where the length of the coupling pipes 324, 326, 328 are a multiple of a quarter wavelength. In this case, the compliance of the larger pipes 334, 336, 338 act as an open end.

Figure 5:
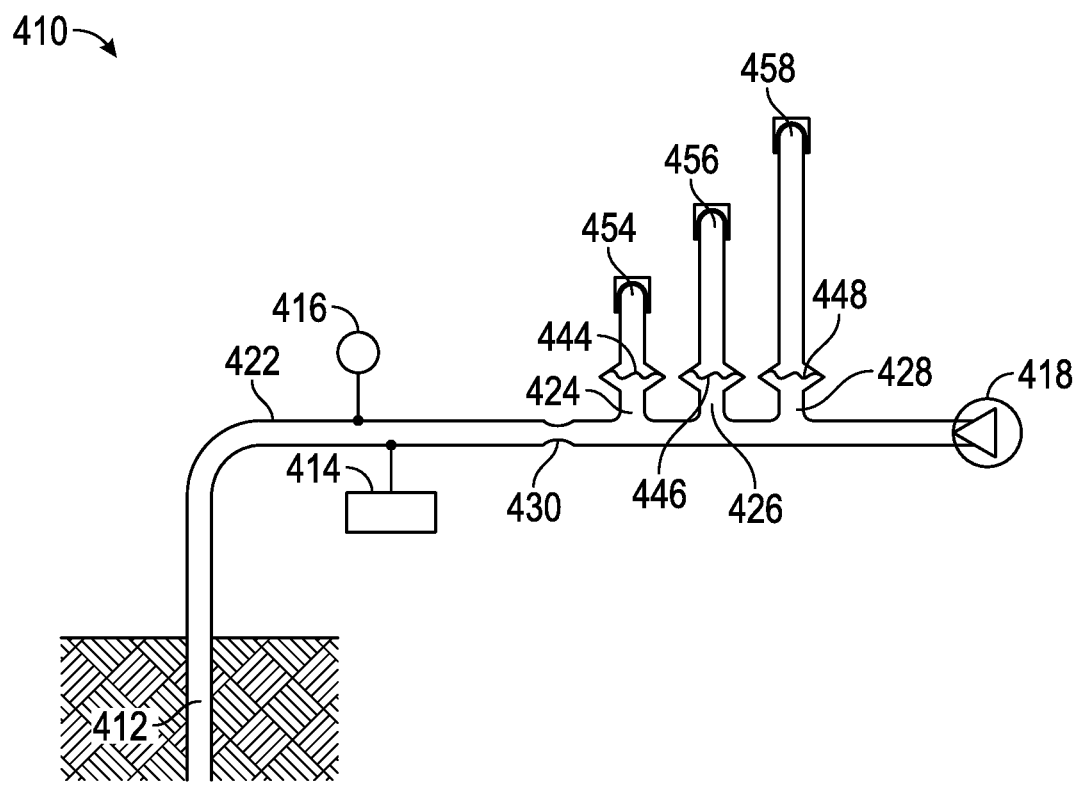
FIG. 5 is a schematic diagram of a pressure wave system with partitioned stubs in accordance with embodiments of the present disclosure.

FIG. 5 similarly shows a system 410 having one or more pumps 418 delivering fluids to a main treating line 422 supplying the wellbore 412, with a pressure measurement system 416 and a signal source 414 coupled to the main treating line 422 downstream from the choke 430 or other flow resistance element, as in FIGS. 2-4. FIG. 5 shows a variation that can be applied to each of the lateral branches in any of FIG. 2-4 or 6-9 below. The lateral branches 424, 426, 428 are equipped with respective partitions 444, 446, 448 to facilitate isolation of the ends 454, 456, 458 of the branches from the treatment fluid in the main line 422. The partitions 444, 446, 448 are shown as diaphragm separators, but sliding pistons, bags, or floating elements are also contemplated to achieve the partition. Such partition also allows the possibility of using a different fluid in the ends 454, 456, 458 such that their effective length is increased relative to their physical length and/or their compliance is increased. For example, relatively compressible fluids such as ether or ethyl alcohol, and high density fluids such as slurries and/or brines, with respect to the treatment fluid in line 422, both act to increase the effective length of a lateral branch.

Figure 6:
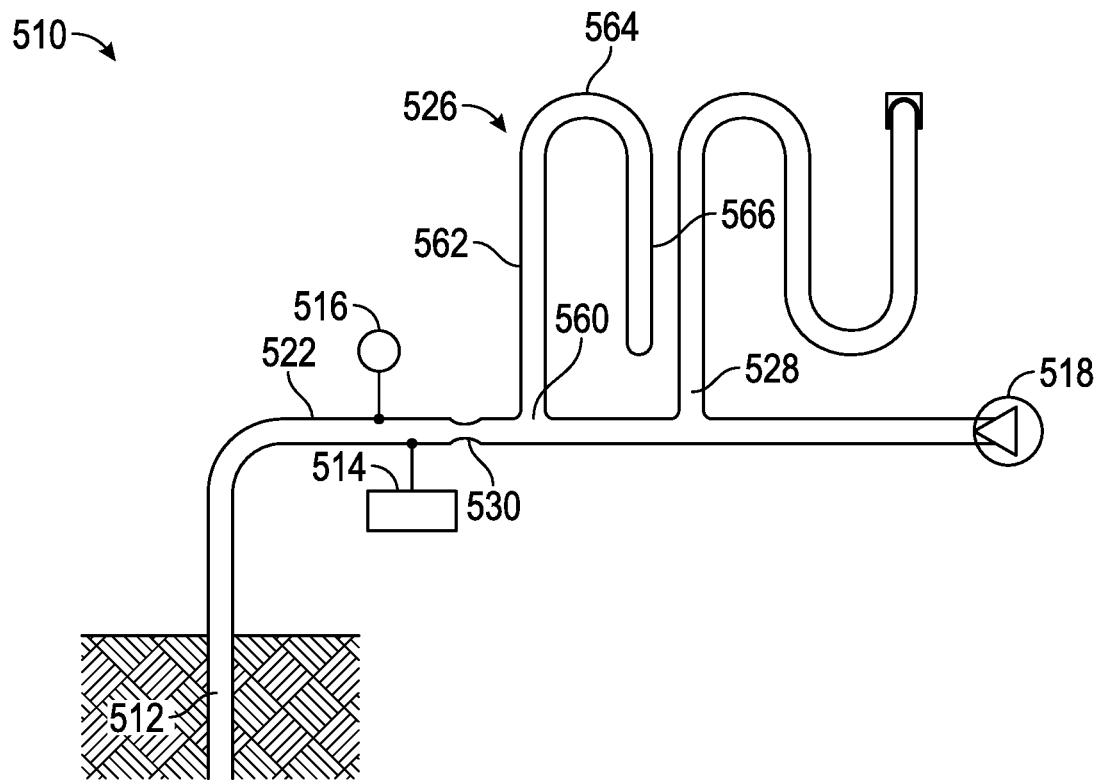
FIG. 6 is a schematic diagram of a pressure wave system with bends and vertical runs in accordance with embodiments of the present disclosure.

FIG. 6 similarly shows a system 510 having one or more pumps 518 delivering fluids to a main treating line 522 supplying the wellbore, with a pressure measurement system and a signal source coupled to the main treating line 522 which may be downstream from a choke, as in FIGS. 2-5. In the embodiments of FIG. 6, the lateral branches 526, 528 comprise an upright or generally vertically oriented port 560 in the treating line 522 leading to a vertical run 562 and one or more bends 564 and or additional vertical runs 566. Where the main line 522 is used to convey slurries, in some embodiments, settling will generally confine any entrained solids to the bottom of the vertical section 562 and keep the bends 564 and vertical runs 566 relatively free of solids. The arrangement of FIG. 6 can also facilitate longer lateral branches in a smaller footprint, e.g., where each vertical run 566 corresponds to an additional acoustic length all of the lateral branches can be confined to the same distance from the main line 522.

Figure 7:
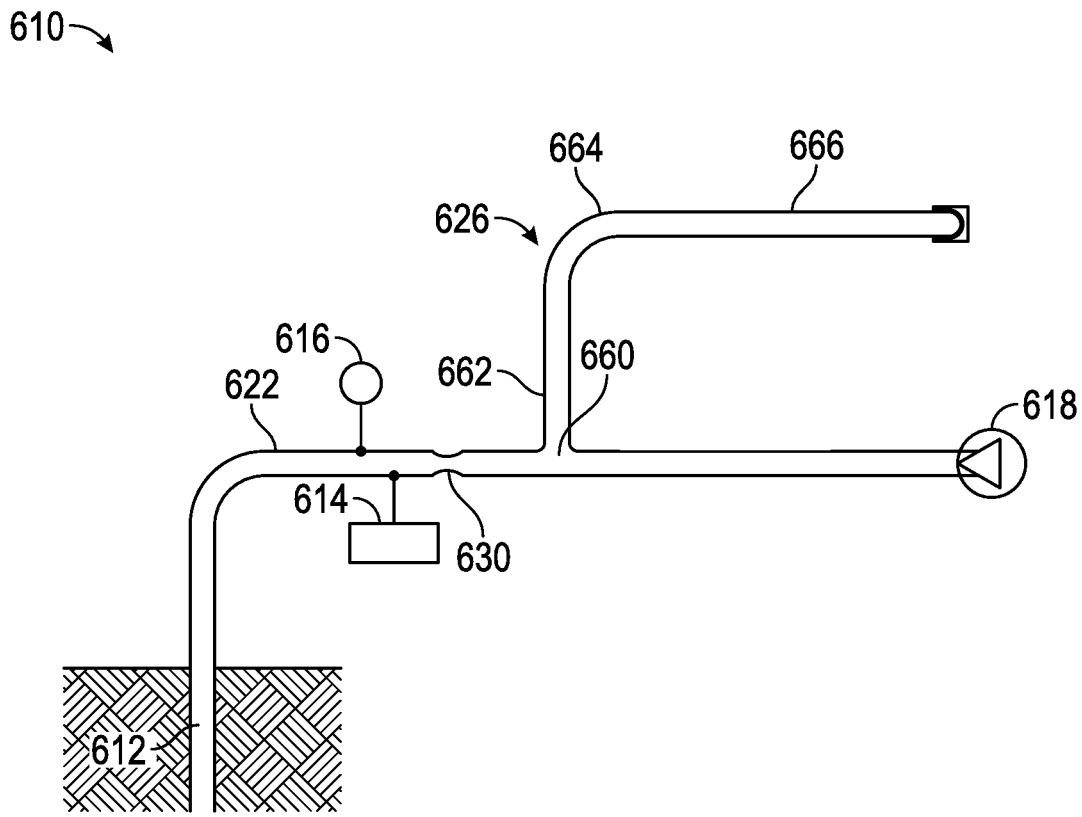
FIG. 7 is a schematic diagram of a pressure wave system with bends and horizontal runs in accordance with embodiments of the present disclosure.

FIG. 7 similarly shows a system 610 having one or more pumps 618 delivering fluids to a main treating line 622 supplying the wellbore, with a pressure measurement system and a signal source coupled to the main treating line 622 which may be downstream from a choke, as in FIGS. 2-6. In the embodiments of FIG. 7, the lateral branch 626 comprises an upright or generally vertically oriented port 660 in the treating line 622 leading to a bend 664 relatively near the tee, and horizontal run 666. Where the main line 622 is used to convey slurries, in some embodiments, the spacing of the bend 664 is chosen so that sand or other particles will settle out before rounding the bend 666, and thus keep the horizontal run 666 relatively free of solids. The arrangement of FIG. 7 can also facilitate effectively longer lateral branches in a smaller footprint, e.g., where the horizontal run 666 is offset from the main line 622 it can provide additional acoustic lengths while remaining within a close distance of the main line 622. Additionally, a combination of vertical runs (FIG. 6) and/or horizontal runs 666 may be used in the same lateral branch.

Figure 8:
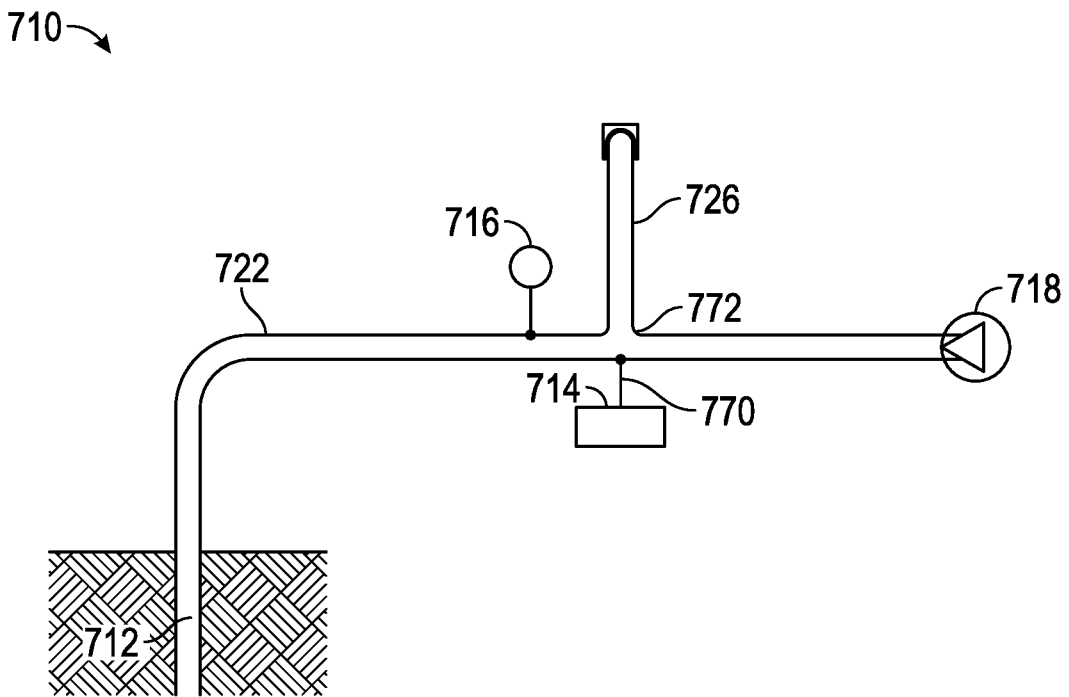
FIG. 8 is a schematic diagram of a pressure wave system with signal wave conditioning in accordance with embodiments of the present disclosure.

FIG. 8 similarly shows a system 710 having one or more pumps 718 delivering fluids to a main treating line 722 supplying the wellbore 712, with a pressure measurement system 716 and a signal source 714 coupled to the main treating line 722 by a coupling 770, which may be a relatively short piece of pipe connected to the joint 772. In the embodiments of FIG. 8, the lateral branch 726 is also connected to the joint 770, e.g., opposite and or coaxially with the coupling 770, for example such that the coupling or joint 770 and branch 726 form a paired acoustic element. In some embodiments, the length of the coupling section 770 and the branch section 726 may be chosen such that the output of the sound source 714 is conditioned as desired, e.g., amplified at the resonant frequency, or filtered to remove an undesired frequency.

Figure 9:
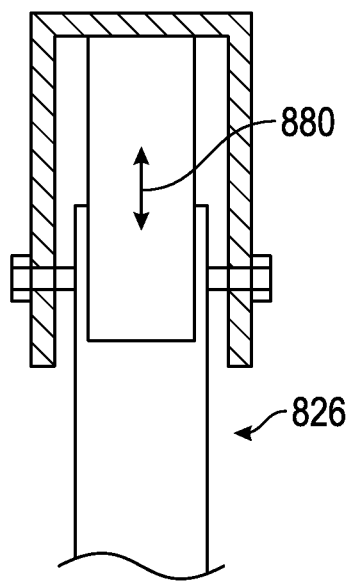
FIG. 9 is a schematic diagram of an adjustable-length lateral branch in accordance with embodiments of the present disclosure.

FIG. 9 shows a variation where the lateral branch 826 is provided with an adjustable piston 880 to correspondingly change the effective acoustic length of the lateral branch.

EMBODIMENTS LISTING

In some aspects, the disclosure herein relates generally to well re-stimulation methods and/or workflow processes according to the following Embodiments, among others:

Embodiment 1: A pressure wave system, comprising: a fluid filled tubular member to propagate a pressure wave; a signal source to generate a pressure wave signal in the tubular member; a sensor to receive the pressure wave signal, a response to the pressure wave signal, or a combination thereof; a source of pressure noise connected to the fluid-filled tubular member; and a noise interference system comprising a lateral branch operatively connected to the tubular member to cancel at least a portion of the pressure noise, amplify the pressure wave signal, filter the pressure wave signal, or a combination thereof.

Embodiment 2: The system of Embodiment 1, wherein the tubular member comprises a well, wherein the noise source comprises a pump, and wherein the lateral branch is acoustically connected to the well to cancel at least a portion of the pressure noise.

Embodiment 3: The system of Embodiment 1 or Embodiment 2, wherein the lateral branch comprises a piping stub and a resonant frequency matching the noise.

Embodiment 4: The system of any preceding Embodiment, wherein the lateral branch comprises a closed end and an acoustic length matching one-half wavelength of the noise or a whole multiple of the one-half wavelength.

Embodiment 5: The system of any preceding Embodiment, wherein the lateral branch comprises an open end and an acoustic length matching one-quarter wavelength of the noise or an odd whole multiple of the one-quarter wavelength.

Embodiment 6: The system of any preceding Embodiment, wherein the interference system comprises a plurality of the resonance-matching piping stubs of different acoustic lengths, the different acoustic lengths matching a combination of lengths selected from one-half wavelength of the noise and whole multiples of the one-half wavelength.

Embodiment 7: The system of any preceding Embodiment, further comprising an adjustable volume in the piping stub to adjust the resonant frequency of the piping stub.

Embodiment 8: The system of any preceding Embodiment, further comprising a flow resistance element in a piping connection between the noise source and the tubular member, wherein the lateral branch is connected on an approach to the choke from the noise source.

Embodiment 9: The system of any preceding Embodiment, wherein the interference system comprises a plurality of the lateral branches on the approach to the flow resistance element [[preferably sonic choke]], the lateral branches comprising respective resonance-matching piping stubs of different acoustic lengths, the different acoustic lengths matching a combination of lengths selected from one-half wavelength of the noise and whole multiples of the one-half wavelength.

Embodiment 10: The system of any preceding Embodiment, wherein the lateral branch comprises a parallel line around the flow resistance element, the parallel line having an acoustic length selected from one-half wavelength of the noise and whole multiples of the one-half wavelength.

Embodiment 11: The system of any preceding Embodiment, wherein the lateral branch comprises a partition acoustically coupling a partitioned fluid in the lateral branch on one side of the partition to the fluid in the tubular member on the other side of the partition.

Embodiment 12: The system of any preceding Embodiment, wherein the fluid partition is selected from a diaphragm, a sliding piston, a bag, a floating element, or a combination thereof.

Embodiment 13: The system of any preceding Embodiment, wherein the partitioned fluid comprises a relatively compressible fluid having a higher compressibility than the fluid filling the tubular member, a relatively high density fluid having a density higher than the fluid filling the tubular member, or a combination thereof.

Embodiment 14: The system of any preceding Embodiment, wherein the lateral branch comprises a riser attached to the connection between the noise source and the tubular member to promote solid settling from the lateral branch into the connection.

Embodiment 15: The system of any preceding Embodiment, wherein the lateral branch further comprises one or more bends in a run connected to an upper end of the riser and or one or more upright and/or horizontal runs connected to respective bends.

Embodiment 16: The system of any preceding Embodiment, comprising: a fluid filled wellbore adapted to propagate a pressure wave; a signal source to generate a pressure wave signal in the wellbore at a first frequency; a sensor to receive the pressure wave signal, a response to the pressure wave signal, or a combination thereof; a pumping unit associated with noise generation at a second frequency different than the first frequency; a transfer line to supply a treatment fluid from the pumping unit to the wellbore; a flow resistance element in the transfer line; and a noise reduction system comprising a plurality of pipe stubs connected to the transfer line upstream of the flow resistance element and having a like plurality of respective resonant frequencies selected from frequencies matching the second frequency and whole multiples of the second frequency.

Embodiment 17: The system of any preceding Embodiment, wherein the pipe stubs comprise respective acoustic lengths selected from lengths matching one-half wavelength of the second frequency and whole multiples of the one-half wavelength.

Embodiment 18: The system of any preceding Embodiment, wherein the flow resistance element comprises a sonic choke.

Embodiment 19: The system of any preceding Embodiment, comprising: a fluid-filled wellbore adapted to propagate a pressure wave; a signal source to generate a pressure wave signal in the wellbore at a first frequency; a sensor to receive the pressure wave signal, a response to the pressure wave signal, or a combination thereof; a pumping unit associated with noise generation at a second frequency; a transfer line to supply a treatment fluid from the pumping unit to the wellbore; a flow resistance element in the transfer line; and a parallel line having opposite ends fluidly connected to the transfer line upstream and downstream of the flow resistance element, and having an acoustic length selected from lengths matching one-half wavelength of the second frequency and whole multiples of the one-half wavelength.

Embodiment 20: A method to suppress noise in a pressure wave detection system, comprising: generating a pressure wave signal to propagate a pressure wave in a fluid filled tubular system; receiving the pressure wave signal, a response to the pressure wave signal, or a combination thereof; introducing pressure wave noise into the fluid-filled tubular system; and connecting a stub to the fluid-filled tubular system to cancel at least a portion of the pressure noise.

Embodiment 21: The method of Embodiment 20, comprising matching a resonant frequency of the stub to the pressure wave noise.

Embodiment 22: The method of Embodiment 20 or Embodiment 21, comprising matching an acoustic length of the stub to one-half wavelength of the pressure wave noise or a whole multiple of the one-half wavelength of the pressure wave noise.

Embodiment 23: The method of any one of Embodiments 20-22, comprising matching an acoustic length of the stub to one-quarter wavelength of the pressure wave noise or an odd whole multiple of the one-quarter wavelength of the pressure wave noise.

Embodiment 24: The method of any one of Embodiments 20-23, comprising connecting a plurality of the stubs to the fluid-filled tubular system.

Embodiment 25: The method of any one of Embodiments 20-24, further comprising introducing the pressure wave noise through a flow line connected to the fluid-filled tubular system, restricting flow at a resistance element in the flow line, and connecting the stub to the flow line upstream from the resistance element.

Embodiment 26: The method of any one of Embodiments 20-25, further comprising partitioning a fluid in the stub from the fluid in the tubular system and acoustically coupling the partitioned fluid to the fluid in the tubular member.

Embodiment 27: The method of any one of Embodiments 20-26, further comprising extending the effective acoustic length of the stub by placing in the stub partitioned fluid having a higher compressibility, a higher density, or a combination thereof, relative to the fluid filling the tubular member.

Embodiment 28: The method of any one of Embodiments 20-27, further comprising gravity settling solids from an upright section of the stub emptying through the connection to the tubular system.

Embodiment 29: The method of any one of Embodiments 20-28, further comprising fluidly connecting one or more bends to an upper end of the upright section of the stub, and one or more upright, horizontal, or combination of upright and horizontal runs.

Embodiment 30: A pressure wave system, comprising: a fluid filled tubular member to propagate a pressure wave; a signal source to generate a pressure wave signal in the tubular member; a sensor to receive the pressure wave signal, a response to the pressure wave signal, or a combination thereof; a source of pressure noise connected to the fluid-filled tubular member; and a noise interference system comprising a lateral branch operatively connected to the tubular member to cancel at least a portion of the pressure noise, amplify the pressure wave signal, filter the pressure wave signal, or a combination thereof.

Embodiment 31: The system of Embodiment 30, wherein the signal source is attached to a pipe coupling connected to a pipe joint operatively connected to the tubular member, and wherein the lateral branch is connected to the pipe joint opposite the pipe coupling to acoustically pair the pipe coupling to the later branch and together form a spaced-pair pressure wave resonator.

Embodiment 32: The system of any one of Embodiments 30 or Embodiment 31, wherein the pressure wave resonator has a resonant frequency to amplify the signal source.

Embodiment 33: The system of any one of Embodiments 30-32, wherein the pressure wave resonator has a resonant frequency to cancel the pressure noise.

Embodiment 34: The system of any one of Embodiments 30-33, wherein the pressure wave resonator has a resonant frequency to filter a noise portion of the signal source having the resonant frequency.

Embodiment 35: A pressure wave system, comprising: a fluid filled wellbore adapted to propagate a pressure wave; a signal source to generate a pressure wave signal in the wellbore at a first frequency; a sensor to receive the pressure wave signal, a response to the pressure wave signal, or a combination thereof; a transfer line to supply a treatment fluid from a pumping unit to the wellbore; a pipe coupling fluidly connected at one end to the signal source and at the other end to a pipe joint in the transfer line; and a pipe stub fluidly connected to the pipe joint opposite the pipe coupling and coaxial therewith to acoustically pair the pipe coupling to the pipe stub and together form a spaced pair pressure wave resonator.

Embodiment 36: The system of any one of Embodiments 30-35, wherein the spaced pair pressure wave resonator has an acoustic length selected from lengths matching one-half wavelength of the first frequency and whole multiples of the one-half wavelength.

Embodiment 37: The system of any one of Embodiments 30-36, further comprising a source of pressure noise having a second frequency, wherein the spaced pair pressure wave resonator has an acoustic length selected from lengths matching one-half wavelength of the second frequency and whole multiples of the one-half wavelength of the second frequency.

Embodiment 38: The system of any one of Embodiments 30-37, wherein the pressure noise source comprises the signal source and the spaced pair pressure wave resonator has a resonant frequency to filter the pressure noise.

Embodiment 39: A method to introduce a pressure wave signal for propagation in a fluid filled tubular system, comprising: fluidly connecting a pressure wave signal source to a pipe coupling; fluidly connecting the pipe coupling transversely to a pipe joint; operatively connecting the pipe joint in fluid communication with the fluid filled tubular system; connecting a stub to the pipe joint opposite the pipe coupling in axial alignment therewith to acoustically pair the pipe coupling to the stub and together form a spaced pair resonator; generating a pressure wave signal from the signal source; and conditioning the pressure wave signal in the spaced pair resonator.

Embodiment 40: The method of Embodiment 39, comprising matching the resonance of the spaced pair resonator to the pressure wave signal and amplifying the pressure wave signal.

Embodiment 41: The method of Embodiment 39 or Embodiment 40, comprising the resonance of the spaced pair resonator to noise in the pressure wave signal and filtering the noise from the pressure wave signal.

Embodiment 42: The method of any one of Embodiments 39-41, further comprising generating pressure wave noise in the tubular system, matching the resonance of the spaced pair resonator to the pressure wave noise and filtering the pressure wave noise.

Embodiment 43: A method to suppress noise in a pressure wave detection system, comprising: generating a pressure wave signal to propagate a pressure wave in a fluid filled tubular system; receiving the pressure wave signal, a response to the pressure wave signal, or a combination thereof; introducing pressure wave noise into a flow line fluidly connected to the fluid-filled tubular system; restricting flow at a resistance element [[preferably sonic choke]] in the flow line; connecting opposite ends of a parallel line to the flow line upstream and downstream of the resistance element; and matching a length of the parallel line to a length selected from one-half wavelength of the pressure way e noise and whole multiples of the one-half wavelength.

Embodiment 44: A method to suppress noise in a wellbore pressure wave detection system, comprising: pumping treatment fluid through a flow line into a wellbore; generating a pressure wave signal at a first frequency to propagate a pressure wave in the wellbore; generating pressure wave noise at a second frequency into the flow line, wherein the first and second frequencies are different; restricting flow at a resistance element [[preferably sonic choke]] in the flow line; connecting to the flow line upstream from the resistance element, a plurality of stubs having a like plurality of respective resonant frequencies selected from frequencies matching the second frequency and whole multiples of the second frequency, to filter the pressure wave noise; and receiving the pressure wave signal, a response to the pressure wave signal, or a combination thereof.

Embodiment 45: The method of Embodiment 44, further comprising tuning the resonant frequency of one or more of the pipe stubs to cancel the second frequency.

Embodiment 46: A pressure wave system, comprising: a liquid filled wellbore adapted to propagate a pressure wave; a signal source to generate a pressure wave signal in the wellbore at a first frequency; a sensor to receive the pressure wave signal, a response to the pressure wave signal, or a combination thereof; a plunger pumping unit associated with noise generation at a second frequency different than the first frequency; a transfer line to supply a treatment fluid from the pumping unit to the wellbore; a flow resistance element in the transfer line; and a noise reduction system comprising a plurality of Helmholtz resonators connected to the transfer line upstream of the flow resistance element and having a like plurality of respective resonant frequencies selected from frequencies matching the second frequency.

Embodiment 47: The system of Embodiment 46, wherein the Helmholtz resonators comprise a small-diameter stub having one end fluidly connected to the transfer line and an opposite end fluidly connected to a large-diameter stub, wherein the large-diameter hub has a diameter larger than the transfer line and a length longer than the small-diameter stub, and wherein the small-diameter stub has a diameter smaller than the transfer line and a length selected from lengths matching one-quarter wavelength of the second frequency and whole multiples of the one-quarter wavelength.

Embodiment 48: A method to suppress noise in a wellbore pressure wave detection system, comprising: pumping treatment fluid through a flow line into a wellbore; generating a pressure wave signal at a first frequency to propagate a pressure wave in the wellbore; generating pressure wave noise at a second frequency into the flow line, wherein the first and second frequencies are different; restricting flow at a resistance element [[preferably sonic choke]] in the flow line; connecting to the flow line upstream from the resistance element, a plurality of Helmholtz resonators having a like plurality of respective resonant frequencies selected from frequencies matching the second frequency and whole multiples of the second frequency, to filter the pressure wave noise; and receiving the pressure wave signal, a response to the pressure wave signal, or a combination thereof.

Although only a few exemplary embodiments have been described in detail above, those skilled in the art will readily appreciate that many modifications are possible in the example embodiments without materially departing from this disclosure. For example, any embodiments specifically described may be used in any combination or permutation with any other specific embodiments described herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' or 'step for' together with an associated function without the recitation of structure.

What is claimed is:

1. A pressure wave system, comprising:
  (a) a fluid filled tubular member to propagate a pressure wave;
  (b) a signal source to generate a pressure wave signal in the tubular member;
  (c) a sensor to receive the pressure wave signal, a response to the pressure wave signal, or a combination thereof;
  (d) a source of pressure noise connected to the fluid-filled tubular member;
  (e) a noise interference system comprising a lateral branch operatively connected to the tubular member, the lateral branch being constructed with an isolated end, a straight section, and a bend section selected to maintain desired noise interference, the noise interference system having at least one selected resonance to cancel at least a portion of the pressure noise, amplify the pressure wave signal, filter the pressure wave signal, or a combination thereof and thereby enabling the sensor to receive at least one of a stronger signal, a more discernable signal, and a more detectable signal; and (f) a flow resistance element located upstream of both the signal source and the sensor and downstream of the noise interference system.

2. The system of claim 1, wherein the tubular member comprises a well, wherein the noise source comprises a pump, and wherein the lateral branch is acoustically connected to the well to cancel at least a portion of the pressure noise.

3. The system of claim 2, wherein the lateral branch comprises a piping stub and a resonant frequency matching a frequency of the noise.

4. The system of claim 3, wherein the lateral branch comprises a closed end and an acoustic length matching one-half wavelength of the noise or a whole multiple of the one-half wavelength.

5. The system of claim 3, wherein the lateral branch comprises an open end and an acoustic length matching one-quarter wavelength of the noise or an odd whole multiple of the one-quarter wavelength.

6. The system of claim 3, wherein the interference system comprises a plurality of the resonance-matching piping stubs of different acoustic lengths, the different acoustic lengths selected to match a resonance selected from one-half wavelength of the noise and whole multiples of the one-half wavelength of the noise.

7. The system of claim 3, further comprising an adjustable volume in the piping stub to adjust the resonant frequency of the piping stub.

8. The system of claim 2, wherein the flow resistance element comprises a choke.

9. The system of claim 8, wherein the interference system comprises a plurality of the lateral branches, the lateral branches comprising respective resonance-matching piping stubs of different acoustic lengths, the different acoustic lengths matching a combination of lengths selected from one-half wavelength of the noise and whole multiples of the one-half wavelength.

10. The system of claim 2, wherein the lateral branch comprises a partition acoustically coupling a partitioned fluid in the lateral branch on one side of the partition to the fluid in the tubular member on the other side of the partition.

11. The system of claim 10, wherein the fluid partition is selected from a diaphragm, a sliding piston, a bag, a floating element, or a combination thereof.

12. The system of claim 10, wherein the partitioned fluid comprises a relatively compressible fluid having a higher compressibility than the fluid filling the tubular member, a relatively high density fluid having a density higher than the fluid filling the tubular member, or a combination thereof.

13. The system of claim 2, wherein the lateral branch comprises a riser attached to the connection between the noise source and the tubular member to promote solid settling from the lateral branch into the connection.

14. The system of claim 13, wherein the lateral branch further comprises one or more bends in a run connected to an upper end of the riser and or one or more upright and/or horizontal runs connected to respective bends.

15. A pressure wave system, comprising:
(a) a fluid filled wellbore adapted to propagate a pressure wave;
(b) a signal source to generate a pressure wave signal in the wellbore at a first frequency;
(c) a sensor to receive the pressure wave signal, a response to the pressure wave signal, or a combination thereof;
(d) a pumping unit associated with noise generation at a second frequency different than the first frequency;
(e) a transfer line to supply a treatment fluid from the pumping unit to the wellbore;
a flow resistance element in the transfer line and located at a point in the transfer line to improve attenuation of the system; and
(g) a noise reduction system comprising a plurality of pipe stubs connected to the transfer line upstream of the flow resistance element and having closed ends, the pipe stubs of the plurality of pipe stubs having a corresponding plurality of respective resonant frequencies and pipe stub lengths selected to match the second frequency and whole multiples of the second frequency, each pipe stub length being different than the pipe stub lengths of the other pipe stubs of the plurality of pipe stubs.

16. The system of claim 15, wherein the lengths of the pipe stubs comprise respective acoustic lengths selected from lengths matching one-half wavelength of the second frequency and whole multiples of the one-half wavelength.

17. The system of claim 15, wherein the flow resistance element comprises a sonic choke.

18. A method to suppress noise in a pressure wave detection system, comprising:
(a) generating a pressure wave signal to propagate a pressure wave in a fluid filled tubular system;
(b) receiving the pressure wave signal, a response to the pressure wave signal, or a combination thereof;
(c) introducing pressure wave noise into the fluid-filled tubular system; and
(d) connecting a plurality of stubs to the fluid-filled tubular system, each stub of the plurality of stubs having a length different than the other stubs of the plurality of stubs to cancel selected portions of the pressure noise.

19. The method of claim 18, wherein a size of the stub is selected to match a resonant frequency of the stub to the pressure wave noise.

20. The method of claim 18, comprising matching an acoustic length of the stub to one-half wavelength of the pressure wave noise or a whole multiple of the one-half wavelength of the pressure wave noise.

21. The method of claim 18, comprising matching an acoustic length of the stub to one-quarter wavelength of the pressure wave noise or an odd whole multiple of the one-quarter wavelength of the pressure wave noise.

22. The method of claim 18, comprising connecting a plurality of the stubs to the fluid-filled tubular system.

23. The method of claim 18, further comprising partitioning a fluid in the stub from the fluid in the tubular system and acoustically coupling the partitioned fluid to the fluid in the tubular member.

24. The method of claim 23, further comprising extending the effective acoustic length of the stub by placing in the stub partitioned fluid having a higher compressibility, a higher density, or a combination thereof, relative to the fluid filling the tubular member.

25. The method of claim 18, further comprising gravity settling solids from an upright section of the stub emptying through the connection to the tubular system.

26. The method of claim 25, further comprising fluidly connecting one or more bends to an upper end of the upright section of the stub, and one or more upright, horizontal, or combination of upright and horizontal runs.

\* \* \* \* \*